Aug. 6, 1957    H. S. SOMMERS, JR., ET AL    2,802,207
METHOD OF ADJUSTING RADAR TRACKING APPARATUS
Filed June 21, 1949    2 Sheets-Sheet 1

Inventors
R. D. O'NEAL
H. S. SOMMERS, Jr.
By M. O. Hayes
Attorney

Aug. 6, 1957  H. S. SOMMERS, JR., ET AL  2,802,207
METHOD OF ADJUSTING RADAR TRACKING APPARATUS
Filed June 21, 1949  2 Sheets-Sheet 2

Inventors
R. D. O'NEAL
H. S. SOMMERS, Jr.
By M. A. Hayes
Attorney

United States Patent Office 2,802,207
Patented Aug. 6, 1957

2,802,207

METHOD OF ADJUSTING RADAR TRACKING APPARATUS

Henry S. Sommers, Jr., New Brunswick, N. J., and Russell D. O'Neal, Ann Arbor, Mich., assignors, by mesne assignments, to the United States of America as represented by the Secretary of the Navy Application June 21, 1949, Serial No. 100,516

6 Claims. (Cl. 343—17.7)

This invention relates to a method of adjusting radar tracking apparatus, and more particularly to a method of adjusting tracking apparatus in which radiation and optical axes are required to be in substantial alignment with each other and in which tracking is accomplished by employing follow up in two mutually perpendicular directions.

According to an embodiment of apparatus suitable for practicing the method of the invention, a source of oscillations of the radar transmitter frequency is provided and located at a convenient distance from the tracking director, for example, 70 feet, and modulated in a manner to provide on a radar range indicator a desired signal. The range gate of the radar is then set on the source, and the radar adjusted to lock on the source. A telescope is provided for sighting a target located near the source, and the radar reflector is shimmed on its support until the optical axis or line of sight of the telescope occupies the desired position parallel to the radar axis.

The method of the instant invention is particularly well adapted for making adjustments in the radar and tracking apparatus described and claimed in the copending application of Henry S. Sommers, Jr., for Method and Apparatus of Target Acquisition, Ser. No. 90,802, filed May 2, 1949.

One of the objects of the invention is to provide a new and improved method of adjusting radar tracking apparatus.

Another object of the invention is to provide a new and improved method suitable for aligning the radiation and optical axes of radar tracking apparatus.

Another object of the invention is to provide a new and improved method suitable for adjusting two dimensional follow up equipment employed in radar tracking apparatus.

Another object of the invention is to provide a new and improved method suitable for measuring the gain of a servo loop employed in radar tracking apparatus.

Other objects and advantages of the invention will become more clearly apparent after a consideration of the following specification when taken in connection with the accompanying drawings, in which.

Figure 1:
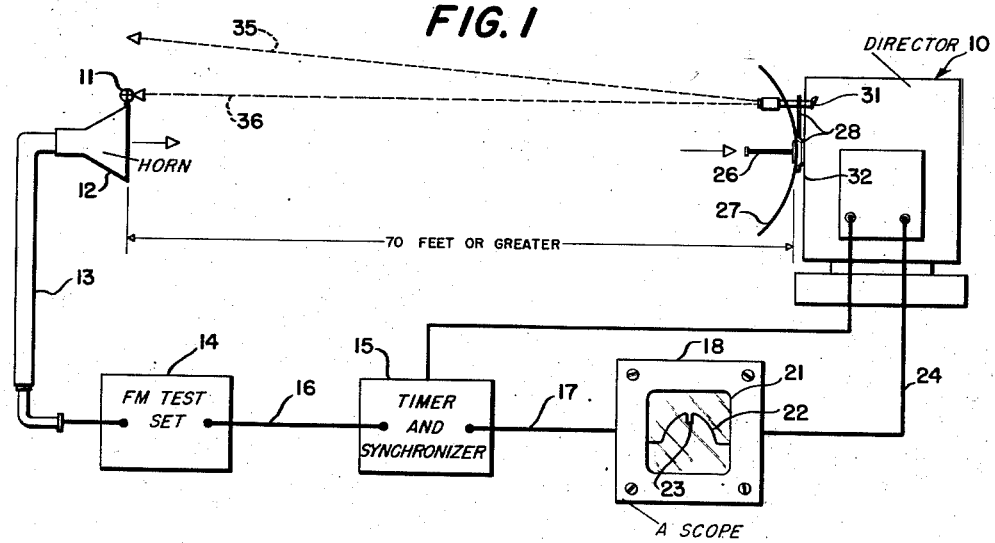
Fig. 1 is a diagrammatic view of an equipment set-up suitable for practicing the method of the invention.

Referring now to the drawings for a more complete understanding of the invention, and in particular to Fig. 1 thereof, there is shown a director, or movable mounting for the antenna, radar components and sighting telescope generally designated by the reference numeral 10, having mounted thereon a support 28, a telescope 31, a reflector 27, and antenna 26, and which includes radar and tracking apparatus, such for example, as that described in the aforementioned copending patent application of Henry S. Sommers, Jr.

A horn 12, energized by waveguide 13 from source of radio frequency, R. F. energy 14, is located a convenient distance from the director 10, for example 70 feet. A target 11 is attached to the horn at a distance and direction from the center thereof corresponding to the distance and direction of telescope 31 from antenna 26, so that undesirable parallax effects are obviated in the practice of the method. Lines 35 and 36 represent the lines of telescope sighting before and after proper alignment respectively.

Figure 2A:
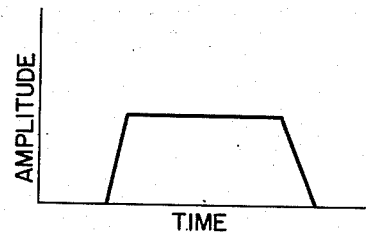
Figs. 2A and 2B are graphs illustrating the operation of the apparatus of Fig. 1.
Figure 2B:
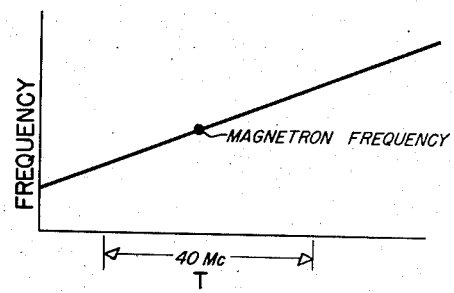

The source 14 may conveniently comprise a source of oscillations of the same frequency as the radar source or magnetron, and be frequency modulated over a range of, for example, 40 megacycles, Fig. 2B, controlled by a modulator trigger or pulse from a radar timer and synchronizer 15 and applied thereto by way of lead 16.

Fig. 2B illustrates a suitable range of frequency modulation, and Fig. 2A a suitable wave shape for the energy in guide 13. The intermediate frequency, I. F. output from the radar receiver is applied by way of lead 24 to an A scope 18 having screen 21, and may provide a trace shape as illustrated at 22.

Figure 3:
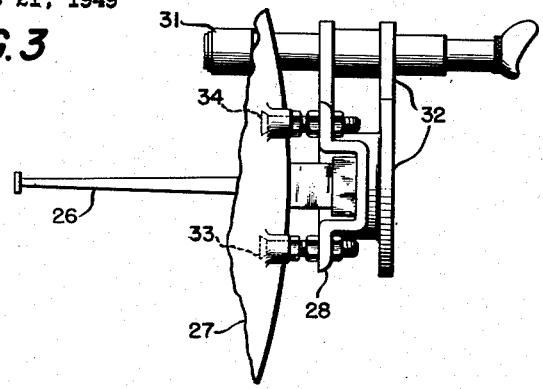
Fig. 3 is an enlarged diagrammatic view of a portion of the director showing the bolts which may be adjusted for shimming the reflector.

In practicing the method of the invention, the range gate of the radar is adjusted until it is substantially in the center of the trace, as shown at 23, and the radar in conical scan thereupon is adjusting for automatic tracking or for aiding range tracking, i. e. is locked on the horn 12. The telescope 31 mounted upon or rigid with yoke 28, Fig. 3, is now sighted through. With the radar still locked on horn 12, the dish or reflector 27 is thereupon loosened by moving bolts 33 and 34, and shimmed or otherwise adjusted while sighting at the target through 31, until, while the radar is locked on horn 12, the telescope 31 sights at 11.

Figure 4:
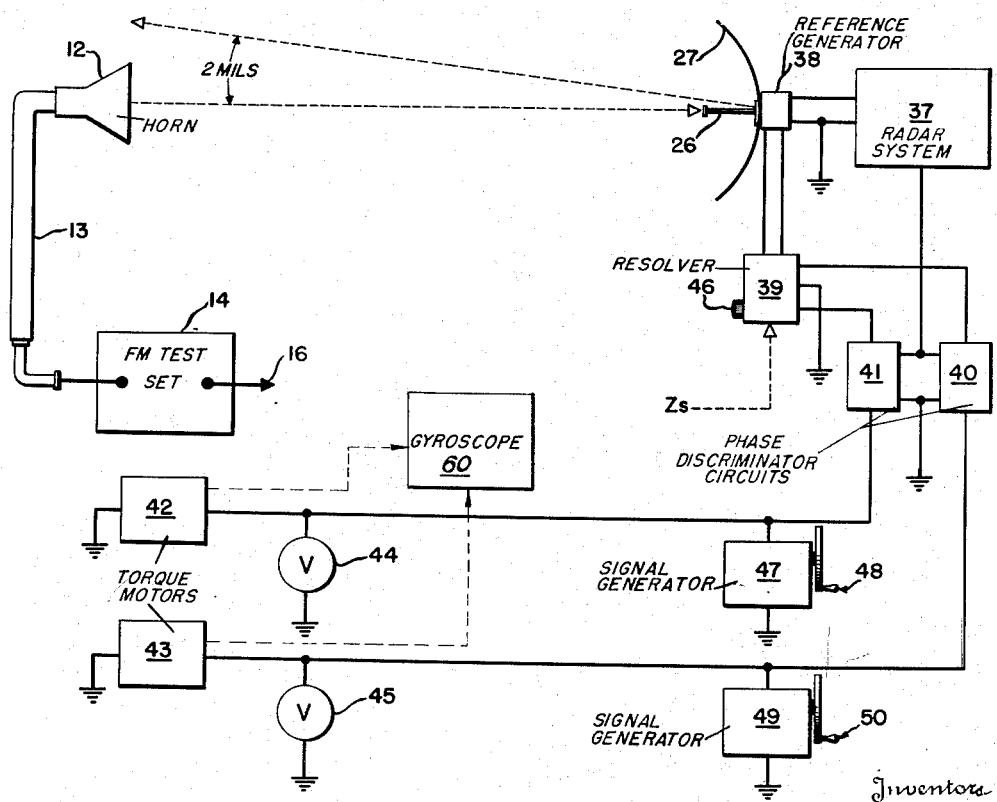
Fig. 4 is an additional diagrammatic view of an alternate equipment set-up suitable for practicing the method of the invention.

Particular reference is made now to Fig. 4, in which the reflector is shown diagrammatically at 27, and the scanning and reference generator mechanism at 38. The scanning and reference generator mechanism may be similar to that shown in the aforementioned copending application of Henry S. Sommers, Jr. The signal from the antenna is applied to radar 37, and the radar angle error signal applied to a pair of phase discriminators 41 and 40 which supply their outputs to torque motors 42 and 43 respectively, and which have signals thereacross measured by voltmeters 44 and 45 respectively.

The torque motors 42 and 43 are utilized to precess a gyroscope 60 which has associated therewith means not shown for deriving two voltages which are measures of the precession in a pair of mutually perpendicular directions, and which are utilized to train and elevate the director, in a manner fully set forth in the aforementioned application of Henry S. Sommers, Jr. The two reference voltages from 38 are applied to resolver 39 such as shown and described in Patents 2,465,624, 2,467,646 and in the publication, "High Precision Autosyn System—Technical Data," published by Eclipse Pioneer Division of Bendix Aviation Corporation as publication #512–29 and copyrighted in 1946, and after resolution applied to the aforementioned phase discriminators. The reference numeral 46 represents a conventional adjustment means for positioning the control elements of the resolver.

The apparatus shown in block form at 47 and 49 are signal generators controlled by handwheels 48 and 50 respectively.

The next step in the method of adjusting the radar tracking apparatus may comprise adjusting the aforementioned reference generator resolver. The antenna is aligned with the horn source, and one hand wheel, for example, the elevation hand wheel 48, cranked to supply a signal which displaces the director a small distance, for example, 2 mils, from its former position. The entire signal from the phase discriminators should be to the vertical torque motor 42 and be indicated by meter 44, while no reading should be observed on the other meter 45. If, however, a signal is observed on 45, adjustment control 46 may be moved to rotate resolver 39 until only the elevation precession torque motor 42 gets a signal when the antenna is elevated.

The gain of the servo loops may also be measured, if desired, as a relationship between the output voltage, at any convenient test point in the gyro system loops, to a given displacement in mils of the director from its original position when fixed on the R. F. source.

As an alternative method of aligning the aforementioned resolver, with the radar tracking system in operation but in optical control, the dish may be displaced by a convenient angle such for example as 3 mils vertically and the radar then thrown to automatic tracking. The path the line of sight of the telescope takes to lock on the target at the horn is observed. If arcs to left or right are observed in the telescope as the radar restores the line of sight to the target, the resolver is not properly aligned. When properly aligned the movement of the telescope line of sight should be a straight line.

$Zs$ is a measure of the angle by which the deck may rotate about the line of sight as a result of roll and pitch of the vessel.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States of America is:

1. The method of adjusting the directional components of a radar system, employing a telescope, a source of radio frequency, a target and a radar system, said radar system including an antenna adjustable in position and having an adjustable reflector, and automatic tracking means; the method comprising adjusting the automatic tracking means to position the antenna in alignment with the radio-frequency source, adjusting the antenna to align the telescope on the target, displacing the antenna and telescope in a first plane while observing the error signal produced in the automatic tracking means by tracking error in a second plane perpendicular to said first plane, adjusting the position of the reflector until the error signal disappears when said antenna is moved in said first plane, adjusting the antenna to realign the telescope on the target, displacing the antenna in the second plane and observing the error signal produced in the tracking means by the tracking error in the first plane, adjusting the reflector to reduce the error signal to zero when the antenna is displaced in the said second plane.

2. The method of aligning the radiation and optical axes of a target tracking system, said system including automatic radar tracking means, the method including the steps of mounting a telescope on the tracking system in spaced relation to the radiation axis of the system, providing a radiating source of radio frequency energy spaced from the system, mounting a target spaced in direction and distance from the radiation axis of the source to correspond to the position of the telescope in its relation to the said system, adjusting the system until the radar tracking means is operative to fix the radiation axis of the system on the source of radio frequency radiation, adjusting the tracking system relative to the radiation axis until the telescope is centered on the target.

3. The method as claimed in claim 2 in which the automatic tracking means includes means to produce error signals proportional to the displacement of the axis of radiation from the line of sight to the said source, said system including an antenna and adjustable antenna reflector, said method including the steps of displacing said antenna in one direction while observing the error signal produced by the automatic tracking means in response to the component of motion in a direction at right angles to the direction of the displacement, adjusting the reflector of the antenna to reduce said error signal to zero.

4. The method of adjusting the tracking system of a radar system having an automatic and an aided tracking mode of operation, comprising aligning the radiation axis of the radar system with a source of radio frequency radiation, displacing said axis from said source in one direction, observing the error signal produced in said tracking system by the component of motion in a second direction at right angles to said first direction, adjusting the tracking mechanism until no error signal is produced in the mechanism to correspond to any component of motion in a direction at right angles to the first direction, adjusting the tracking mechanism until no error signal is produced corresponding to the first direction when the tracking mechanism is moved in said second direction.

5. The method as claimed in claim 2 comprising the additional steps of displacing said radiation axis of said system from the line of sight to the target in a first direction, observing the path of the optional axis of the telescope relative to the target as the automatic tracking means returns the radiation axis of the system to the line of sight to the target, adjusting the system to cause the return path to be a straight line, displacing the radiation axis in a second direction at right angles to the first direction and observing the path of the optical axis of the telescope relative to the target as the automatic tracking means returns the radiation axis of the system to the line of sight to the target, adjusting the system to cause the return path to be a straight line.

6. The apparatus for aligning the radiation and optical axis of a target tracking system comprising a radar tracking system, an antenna mounting for said system, an antenna, and adjustable reflector for said antenna mounted on said mounting, a telescope, said telescope being mounted on said mounting and offset from the axis of radiation of said system, a radio frequency radiator spaced from said antenna and antenna mounting, a target mounted on said radiator offset from the axis of radiation in direction and amount to correspond with the offset of the telescope from the reflector axis, a source of radio frequency coupled to the radiator to radiate energy to said antenna and reflector to activate the tracking system.

References Cited in the file of this patent

UNITED STATES PATENTS

| | | |
|---|---|---|
| 1,994,177 | Nolan | Mar. 12, 1935 |
| 2,380,501 | Christian | July 31, 1945 |
| 2,418,465 | Doba | Apr. 8, 1947 |
| 2,421,016 | Deloraine et al. | May 27, 1947 |
| 2,425,600 | Coykendall | Aug. 12, 1947 |
| 2,479,565 | Grossman | Aug. 23, 1949 |